Oct. 28, 1924.

R. C. G. S. OELS 1,513,264

VACUUM CONTAINER

Original Filed May 22, 1922

INVENTOR
RUDOLPH C. G. STARTS OELS
BY
ATTORNEYS

Patented Oct. 28, 1924.

1,513,264

UNITED STATES PATENT OFFICE.

RUDOLPH C. G. STAATS OELS, OF BROOKLYN, NEW YORK.

VACUUM CONTAINER.

Application filed May 22, 1922, Serial No. 562,622. Renewed June 26, 1924.

*To all whom it may concern:*

Be it known that I, RUDOLPH C. G. STAATS OELS, a citizen of the United States, and resident of Brooklyn, in the county of Kings and State of New York, have invented certain new and useful Improvements in Vacuum Containers, of which the following is a specification.

The principal object of this invention is to provide a new and improved construction in a vacuum container which will enable the same container to be used to carry both hot and cold fluids or other material at the same time and to prevent heat exchanges between the different materials as well as between the contents of the container and the surrounding atmosphere.

Another object is to provide a vacuum container with a stopper having a vacuum chamber and a compartment to hold a freezing mixture.

A further object is to provide the stopper with a resilient means adapted to contact with the cover of the container and force the stopper downwardly under pressure against the top of the contents of the container, and another object is to provide a movable partition of such a construction that a double vacuum will be provided for dividing or insulating the container into compartments.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification—

Figure 1:
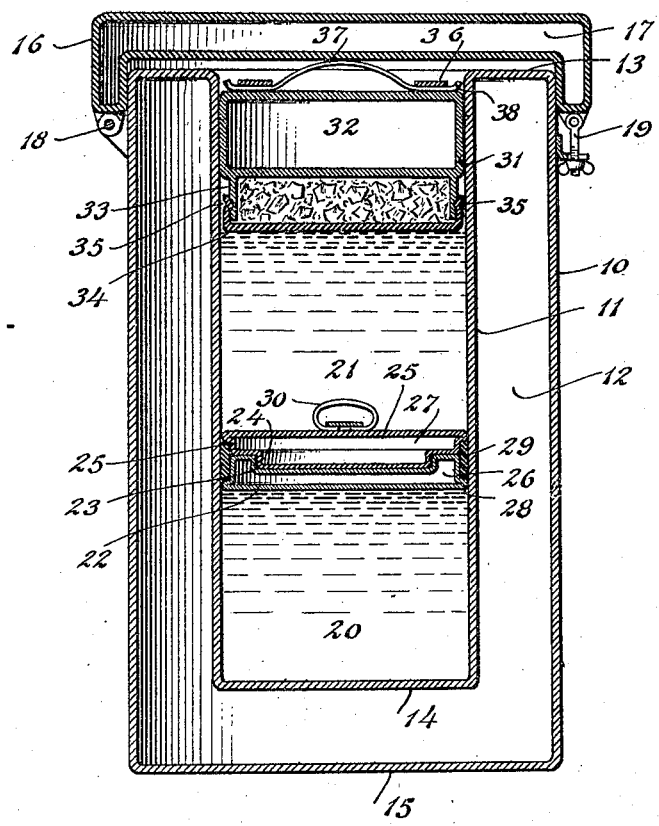
Fig. 1 is a central section through a container embodying my invention.
Figure 2:
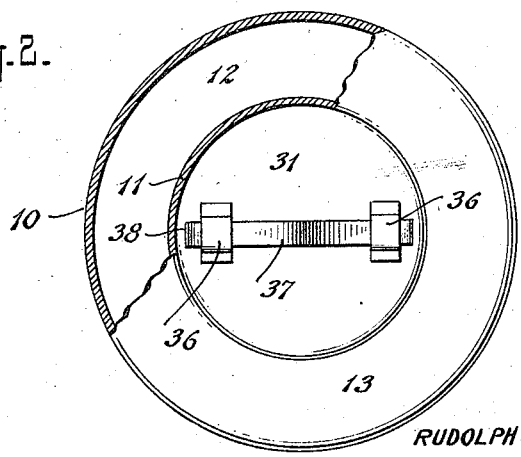
Fig. 2 is a top view of the container shown in Fig. 1 with the cover removed and a portion of the container shown in section.

As shown in the drawings, the numeral 10 indicates the outer side walls of the main body of the container between which and the inner side walls 11 a suitable space 12 is defined. The side walls 10 and 11 are suitably joined together at the top as by the annular portion 13, which with the side walls 10, 11 and the bottom portions 14 and 15 completely enclose the space 12, it being understood that the air is exhausted from said space by any suitable means after which the container is hermetically sealed. The container is shown in the drawings as of cylindrical shape but it will be understood that any desired shape, size or configuration may be resorted to and that the manner of constructing the same or the material used obviously can be varied as desired.

The inner walls 11 and bottom portion 14 define the material holding chamber of the container and both sides of the walls as well as the other portions of the body of the container are preferably coated thoroughly with a heat insulating paint or coating.

A cover 16 which is also preferably provided with a vacuum chamber 17 is hinged as at 18 to the container body and is provided with any suitable latching means such as indicated at 19.

A partition is provided for the purpose of dividing the material holding chamber into separate compartments as indicated by the numerals 20 and 21 and comprises a lower member 22 provided on its upper face with a recess 23 in which is received the cooperating projecting portion 24 of the upper member 25. The lower and upper members 22 and 25 are provided with the vacuum chambers 26 and 27 respectively and each of these members are also preferably coated with a suitable heat insulating composition. The portion 24 and recess 23 may be provided with cooperating screw threads as indicated, or they may be merely secured together by a tight press fit. Each of the members 22 and 25 are provided with a projecting annular flange 28 between which is secured a packing 29 of rubber or other suitable material. The dimensions of the flanges 28 and the packing 29 are so proportioned that the partition will be a tight sliding fit in the material chamber and a handle 30 is provided for convenience in moving the partition as desired.

A stopper 31 is also preferably provided with a vacuum chamber 32. The lower face of the stopper 31 is provided with a depending annular portion 33 which is preferably detachable from the stopper 31 about which is adapted to be engaged a cup member 34, suitable cooperating projections and depressions indicated generally by the numeral 35, being provided for holding the cup 34 in detachable engagement with the annular portion 33.

Suitable means for holding the stopper firmly pressed against the contents of the container may be provided and comprise a pair of stirrup braces 36 suitably secured to the upper face of the stopper, between which and the upper face of the stopper is slidably held a bowed flat spring 37. When the cover 17 is closed upon the stopper, the upwardly bowed portion of the spring 37 will be engaged by the cover and will place the spring under tension, thereby urging the stopper downwardly into the chamber of the container. When the cover is opened, the bowed portion of the spring will serve as a handle for removing the stopper. It will be noted that the ends of the springs are curved upwardly as at 38 to prevent the spring from being pulled out of the braces 36 when it is used as a handle, to remove the stopper.

The manner in which the container is adapted for use is as follows, assuming that it is desired to carry or preserve a quantity of both hot and cold liquids or materials for a considerable time without a great amount of heat exchange as for instance, coffee and ice cream on a picnic or outing. The hot coffee will preferably be placed in the material chamber first after which the partition will be placed in the chamber until it contacts with the fluid, thus dividing the chamber into the compartments 20 and 21. The compartment 21 may then be filled with ice cream for example, the double vacuum of the partition effectively preventing any heat exchange between the materials in the compartments. Obviously any number of partitions may be used.

If a substance which it is desired to keep cold is placed in the upper compartment 21, a quantity of a freezing mixture such as ice and salt is placed within the cup 34 and the spring 37 pressing the stopper 31 downwardly will prevent an air cushion being formed between the stopper and contents and will also cause the influence of the freezing mixture to be more effective.

Having thus described my invention, what I claim as new and desire to secure by Letters Patent of the United States, is:—

1. In a vacuum container, adjustable means to divide the container into separate compartments, said means provided with a partition composed of two separable members each of which is provided with a vacuum chamber.

2. In a vacuum container, adjustable means to divide the container into separate compartments, said means provided with a partition composed of two separable members each of which is provided with a vacuum chamber, and a heat insulating packing secured between said members.

3. In a vacuum container, a cover and a stopper, said stopper provided with a vacuum chamber and a compartment adapted to hold a freezing mixture.

4. In a vacuum container, a cover and a stopper, said stopper provided with a vacuum chamber, and a depending annular portion, a cup shaped member adapted to be detachably engaged with said annular portion and defining therewith a compartment.

5. In a vacuum container, adjustable means to divide the container into separate compartments, said means provided with a partition composed of two separable members each of which is provided with a vacuum chamber and a projecting annular flange, and a heat insulating packing secured between said flanges.

Signed at New York, in the county of New York and State of New York, this 19th day of May A. D. 1922.

RUDOLPH C. G. STAATS OELS.